(12) United States Patent
Giometti

(10) Patent No.: US 7,204,363 B1
(45) Date of Patent: Apr. 17, 2007

(54) MACHINE FOR INSPECTING BOTTLES

(75) Inventor: Stephen M. Giometti, Horseheads, NY (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 11/487,748

(22) Filed: Jul. 17, 2006

(51) Int. Cl.
*B65G 47/31* (2006.01)

(52) U.S. Cl. .................................. 198/461.1

(58) Field of Classification Search ............. 198/461.1, 198/461.2
See application file for complete search history.

(56) References Cited

U.S. PATENT DOCUMENTS

| | | | | |
|---|---|---|---|---|
| 3,618,743 A | * | 11/1971 | Benatar et al. ............. | 198/384 |
| 3,827,545 A | * | 8/1974 | Buhavar .................. | 198/461.2 |
| 3,938,650 A | * | 2/1976 | Holt ........................ | 198/419.3 |
| 4,173,278 A | * | 11/1979 | Reitter .................... | 198/461.1 |
| 4,679,685 A | * | 7/1987 | Inoko ...................... | 198/461.1 |
| 5,318,165 A | * | 6/1994 | Spatafora et al. .......... | 198/433 |
| 5,762,175 A | * | 6/1998 | Focke et al. ............. | 198/461.2 |
| 5,906,265 A | * | 5/1999 | Spatafora .................. | 198/460.2 |
| 6,203,004 B1 | * | 3/2001 | Spatafora et al. ............ | 271/31 |
| 6,669,006 B2 | * | 12/2003 | Antoniazzi et al. ...... | 198/461.1 |

* cited by examiner

*Primary Examiner*—Joe Dillon, Jr.
(74) *Attorney, Agent, or Firm*—Spencer T. Smith

(57) ABSTRACT

A machine for inspecting bottles which has a conveyor for conveying bottles at a first velocity. A bottle spacing mechanism receives bottles conveyed by the conveyor at a first location and releases bottles on the conveyor at a second downstream location. The bottle spacing mechanism includes a first belt conveyor defining one side of a conveyor path for bottles progressing from the first location to the second location, a first drive mechanism including a drive pulley for driving the first belt conveyor at the first velocity, an upstream second conveyor and a downstream third conveyor defining the other side of the conveyor path for bottles progressing from the first location to the second location, a second drive mechanism including a drive pulley for driving the second belt conveyor at a second velocity lower than the first velocity whereby a bottle conveyed between the first and second conveyors will be conveyed at a velocity lower than the first velocity, and a third drive mechanism including a drive pulley for driving the third belt conveyor at the first velocity whereby a bottle conveyed between the first and third conveyors will be conveyed at the first velocity, the second velocity resulting in bottles released onto the conveyor having a selected spacing.

3 Claims, 2 Drawing Sheets

MACHINE FOR INSPECTING BOTTLES

The present invention relates to machines which inspect bottles for visual or structural defects.

BACKGROUND OF THE INVENTION

There are several methods of inspecting glass bottles for defects that require the bottles to be spaced apart on a conveyor while the inspection is being performed. The current method of doing this is to use a mechanical device to slow down the bottle relative to the conveyor speed and than release it back on the conveyor where it accelerates back to conveyor speed. This mechanical device can take the form of a belt conveyor, opposed compliant wheels or a spring loaded finger wheel. At higher bottle throughput speeds, the bottle slides on the conveyor as it accelerates back to conveyor speed. This leads to inconsistent spacing of the bottles and instability of the bottles on the conveyor. This instability and the drag on the bottle from the stationary guide rails can lead to bottles tipping over and jamming.

OBJECT OF THE INVENTION

The goal of this invention is to consistently space the containers on the conveyor for inspection, while eliminating the instability of the bottle as it is released back on to the conveyor.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE PREFERRED EMBODIMENT

Figure 1:
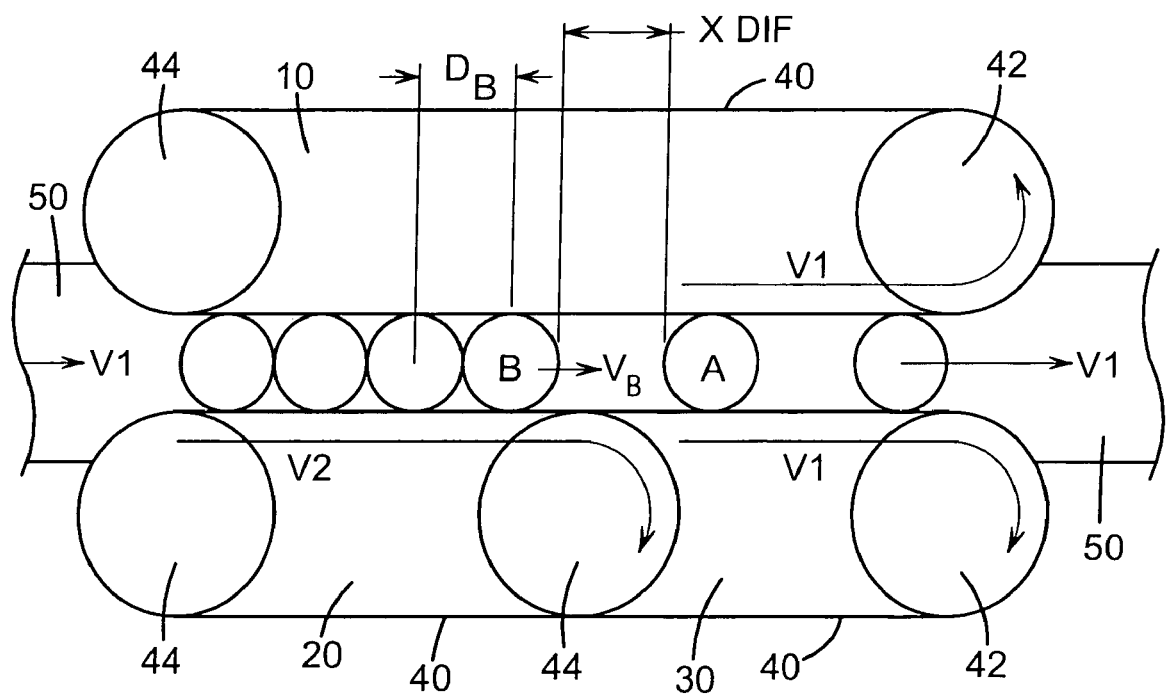
FIG. 1 is a schematic top view of a portion of a container inspecting machine made in accordance with the teachings of the present invention and FIG. 2 is a block diagram illustrating the control of the bottle spacing mechanism of the container inspecting machine shown in FIG. 1.

The inspection machine has a bottle spacing mechanism made up of three compliant belt conveyors (10, 20 and 30). The belts 40 are typically toothed timing belts with foam facing. Each belt conveyor includes a motor driven drive pulley 42, located at the downstream end and an idler pulley 44 at the upstream end (the drive pulley for the lower left hand belt conveyor is located beneath the idler roller for the lower right hand belt conveyor). The foam compresses when a bottle 48 is trapped between opposing belt conveyors. The bottles 48 are riding on a flat top chain conveyor 50 which is driven by a suitable drive (not shown) at a linear velocity of V1. Belt conveyors 10 and 30 are moving at the same linear velocity V1. Belt conveyor 20, travels at a lower linear velocity V2. Upon entering the bottle spacing mechanism, a bottle is trapped between belt conveyors 10 and 20. The bottle's linear velocity ($V_B$) is based on the belt velocities. It can be shown that the bottle will travel at a linear velocity equal to:

$$V_B = [V1+V2]/2$$

V2 is less than V1 and may be zero in the event V2 is zero or the belt is replaced with a stationary side rail. This will slow down the bottle's linear velocity and it will cause the bottles to roll between the belts. This area is the low-speed section. When the bottle reaches belt conveyor 30, it will change linear velocity again based on the opposing belt speeds. Belt conveyors 10 and 30 both travel at linear velocity V1. This area is the high-speed section. The bottle's linear velocity will be V1 substantially matching the chain conveyor velocity to obtain a smooth transfer. Two bottles entering the device that are in contact with each other will be spaced apart a distance equal to the bottle diameter ($D_B$). When bottle A, transitions from the low-speed to the high-speed section, its linear velocity will increase to V1. Bottle B will still be in the low-speed section traveling at a linear velocity of $V_B$. This difference in linear velocities will create spacing between bottles A and B. This spacing will be based on the two bottle velocities (V1 and $V_B$) and the amount of time (T) that the bottles are at different velocities. This time (T) is equal to the time it takes bottle B to reach the high-speed section after bottle A has reached it. This time is equal to:

$$T = D_B/V_B$$

With position (X) being the position of the two bottles at the moment bottle B leaves the low-speed section:

$$X_A = V1 \times T$$

$$X_B = V_B \times T$$

The bottle spacing $X_{DIF}$ is equal to:

$$X_{DIF} = X_A - X_B$$

Combining equations 2 and 5:

$$X_{DIF} = [(V1/V_B) \times D_B] - [(V_B/V_B) \times D_B]$$

Reducing this equation:

$$X_{DIF} = [(V1/V_B) \times D_B] - D_B$$

This shows that the spacing of bottles leaving this device will be based on the speeds of the belts and the diameter of the bottles. This device will space containers effectively and return them to the chain conveyor at the same velocity. Varying the speed of belt conveyor 20 will vary the spacing.

When V2 is 0:

$$X_{DIF} = D_B$$

This more simple device, will always take bottles that enter in contact with each other and space them a distance apart that is equal to the bottle diameter and deliver them back on the conveyor smoothly.

Figure 2:
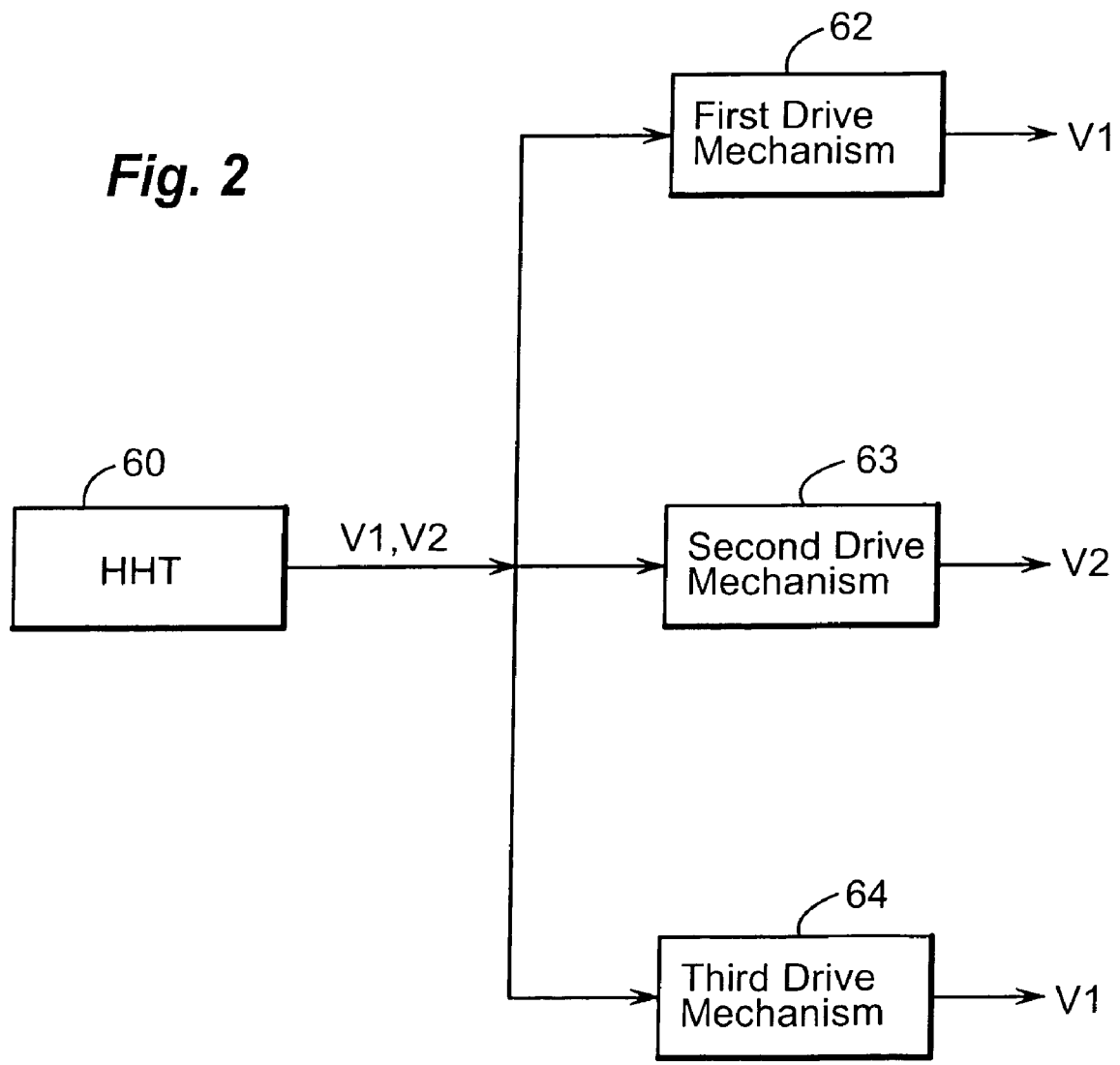

As shown in FIG. 2, a hand held terminal (HHT/60) or other suitable computer input, delivers V1 to the First Drive Mechanism 62 and to the Third Drive Mechanism 64 and delivers V2 to the Second Drive Mechanism 63. V1 and V2 can be selected to define the desired spacing.

The invention claimed is:
1. A machine for inspecting bottles comprising
a conveyor which conveys bottles at a first velocity,
a bottle spacing mechanism for receiving bottles conveyed by said conveyor at a first location and for releasing the bottles onto said conveyor at a second downstream location including a first belt conveyor defining one side of a conveyor path for bottles progressing from said first location to said second location, a first drive mechanism including a drive pulley which drives said first belt conveyor at the first velocity, an upstream second belt conveyor and a downstream third belt conveyor defining the other side of the conveyor path for bottles progressing from said first location to said second location, a second drive mechanism including a drive pulley which drives said second belt conveyor at a second velocity lower than said first velocity whereby a bottle conveyed between said first and second conveyors will be conveyed at a velocity lower than the first velocity, and a third drive mechanism including a drive pulley which drives said third belt conveyor at the first velocity whereby a bottle conveyed between said first and third conveyors will be conveyed at the first velocity, said second velocity resulting in bottles released onto the conveyor having a selected spacing.

2. A machine for inspecting machines according to claim 1, wherein said bottle spacing mechanism further includes an input device for defining the second velocity of said second drive mechanism.

3. A machine for inspecting machines according to claim 1, wherein the second velocity is zero.

* * * * *